United States Patent [19]

Consolati

[11] Patent Number: 4,570,289
[45] Date of Patent: Feb. 18, 1986

[54] RESILIENT SPECTACLES HINGE AND METHOD FOR MAKING A SPECTACLES FRAME BEARING A RESILIENT SPECTACLES HINGE

[76] Inventor: Piero Consolati, Via Aselli, 23, 20100 - Milano, Italy

[21] Appl. No.: 516,885

[22] Filed: Jul. 25, 1983

[30] Foreign Application Priority Data

Jul. 30, 1982 [IT] Italy ................... 22691 A/82

[51] Int. Cl.[4] .................... G02C 5/22; B21D 53/40
[52] U.S. Cl. ................................. 16/228; 16/332;
29/11; 29/20; 29/434; 29/436; 351/113;
351/121; 351/153
[58] Field of Search ............... 29/11, 434, 436, 20;
16/228, 332; 351/113, 153, 121

[56] References Cited

U.S. PATENT DOCUMENTS

| | | | |
|---|---|---|---|
| 1,395,593 | 11/1921 | Oknianski | 29/11 X |
| 1,494,139 | 5/1924 | Simon | 16/228 |
| 1,708,202 | 4/1929 | Welsh et al. | 29/11 |
| 2,098,921 | 11/1937 | Mandaville | 16/228 X |
| 2,874,609 | 2/1959 | Ducati | 16/228 X |
| 3,064,530 | 11/1962 | Viganó351 | 113/ |
| 3,644,023 | 2/1972 | Villani | 16/228 X |
| 3,837,735 | 9/1974 | Guillet | 16/228 X |
| 3,957,360 | 5/1976 | Villani | 351/153 X |
| 4,244,081 | 1/1981 | Beyer et al. | 16/228 |
| 4,456,346 | 6/1984 | Beyer | 16/228 X |

FOREIGN PATENT DOCUMENTS

| | | | |
|---|---|---|---|
| 2948113 | 6/1981 | Fed. Rep. of Germany | 351/153 |
| 7501437 | 8/1976 | France | 351/121 |

Primary Examiner—Howard N. Goldberg
Assistant Examiner—Ronald S. Wallace
Attorney, Agent, or Firm—Bucknam and Archer

[57] ABSTRACT

The method comprises the steps of making a hinge by using conventional materials and treatments and applying, on the edge of the hinge provided for contacting and biassing a ball member, one or more cup members, made of a hard metal material and effective to provide a cam profile configuration.

9 Claims, 13 Drawing Figures

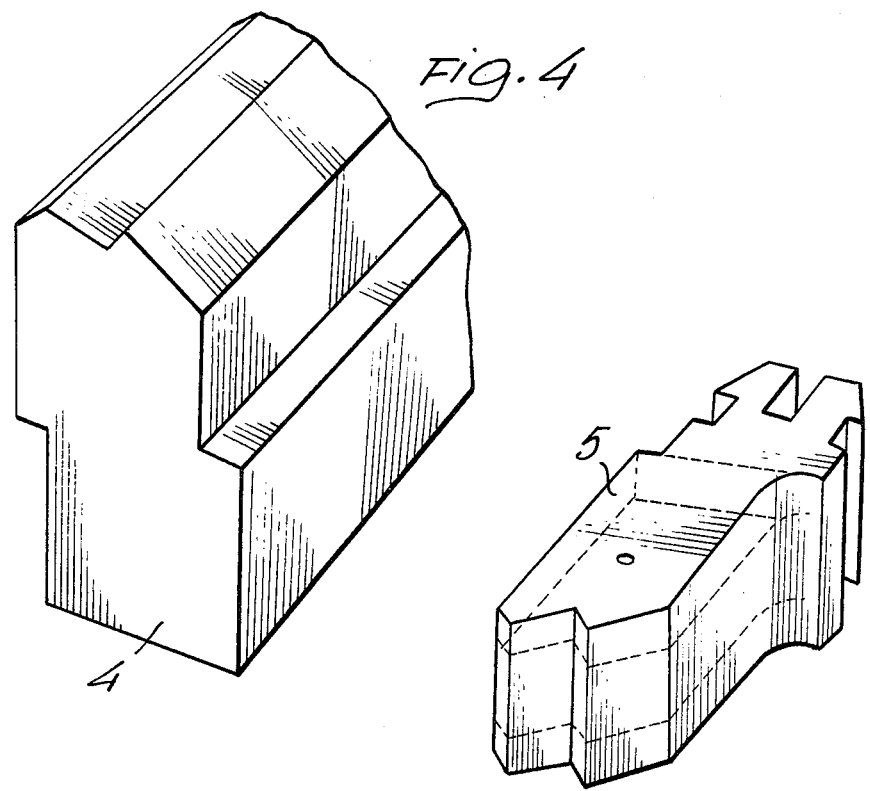
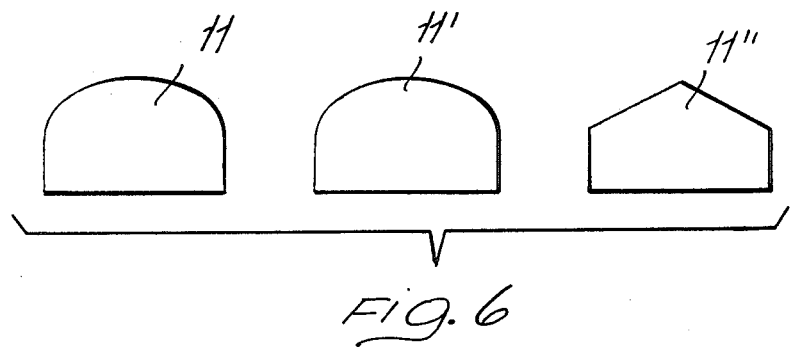

RESILIENT SPECTACLES HINGE AND METHOD FOR MAKING A SPECTACLES FRAME BEARING A RESILIENT SPECTACLES HINGE

BACKGROUND OF THE INVENTION

The present invention relates to a method for making resilient hinges for spectacles.

As it is well known, resilient hinges for spectacles frames are presently commercially available which allow for the spectacles arms to be resiliently gradually biassed with respect to the spectacles frame front portion owing to the provision of resilient biassing means acting on a suitably shaped cam profile.

In particular resilient hinges are known of the so-called double action type, i.e. effective to provide a resilient reaction both in the arm opening step (that is with the spectacles arm parallel to one another during the use) and in the arm closure step, with the spectacles arm in a closed condition at rest.

The operating principle of the mentioned hinges is that of the resilient reaction provided by a cam profile on which a ball member is caused to slide as it is biassed by a spring.

In order to obtain an efficient and proper resilient reaction it is required that the cam member cooperating with said ball member, be made from a high hardness material.

In fact, if the hardness of said material is poor, the ball member would be susceptible to penetrate into the cam surface, thus impairing the cam effect thereof, because of wear.

Thus, the mentioned cam member is generally made starting from hardened steel or a sinterized material.

On the other hand, these materials are affected by practical drawbacks, since they are necessarily to be subjected to protecting treatments; moreover they may be hardly processed to obtain the desired shapes and coupling to other components of the frame.

More specifically, as thereinabove stated, the pieces made starting from the mentioned materials are to be suitably processed in order to prevent said pieces from being quickly oxidated.

The protecting covering layer, on the other hand, may be obtained only by carrying out determined processing steps (for example sealing of the steel cam member to the front of the spectacles frame) and, accordingly, other portions of the spectacles are affected, with consequent increased costs.

Moreover, a steel material may be hardly machined by tools, particularly as the conventional method for making not resilient hinges is used.

It should also be noted that presently available spectacles are provided with nickel silver hinges so shaped as to allow for the spectacles arm to be adjusted in its slant, in order to fit the spectacles to the user face.

On the other hand, the steel cam member is made in a single piece with the spectacles front portion, thereby it may be hardly subjected to modifications.

With respect to the applying and coupling features, it should be noted that, in plastics spectacles, the anchoring blade embedded in the spectacle front portion, acts as a cutting blade susceptible to cut through the spectacles as the latter are stressed during the use of because of temperature variations.

Moreover, because of contingent requirements, that is because of constructional reasons, the cam member is arranged at the outermost end of the spectacles frame, jointly to the front portion acting as an insert, thus facilitating possible breakages.

SUMMARY OF THE INVENTION

Accordingly, the object of the present invention is that of overcoming the thereinabove mentioned drawbacks by providing a method for making spectacles resilient hinges which may be carried out easily and at a reduced cost.

It is a main object of the present invention to provide such a method that, there is eliminated the need of carrying out protecting surface treatments on the produced hinges.

Another object of the present invention is to provide such a method which is effective to afford the possibility of obtaining such a spectacles hinge which is so designed as to be easily adjustable in order to properly fit the spectacles to the wearer face.

Yet another object of the present invention is to provide such a method which affords the possibility of making resilient spectacles hinges applicable between the spectacles front portion and related arm, in a simple way and without any danger of spoiling the spectacles frame.

Yet another object of the present invention is to provide such a method affording the possibility of making several types of spectacles resilient hinges.

Yet another object of the present invention is to provide such a spectacles resilient hinge in which the opening dead point may be easily adjusted in order to reset the arms to their parallelism relationship.

Yet another object of the present invention is to provide such a method that reduced size resilient hinges may be produced, effective to be applied on light and thin frames.

According to one aspect of the present invention the above task and objects, as well as yet other objects which will become more apparent hereinafter are achieved by a method for making spectacles resilient hinges, of the cam profile and spring biassed ball type, characterized in that it comprises the steps of making a hinge by using conventional materials and treatments and applying, on the edge of said hinge provided for contacting and biassing said ball, one or more cup members, made of a hard material, and effective to provide said cam profile.

BRIEF DESCRIPTION OF THE DRAWINGS

Further characteristics and advantages of the method for making spectacles resilient hinges according to the present invention will become more apparent thereinafter from the following detailed description of some embodiments thereof, with reference to the accompanying drawings, where:

FIG. 4 illustrates a sectional member substantially reproducing the contour of the mentioned hinge portion.

FIG. 5 illustrates a plate member from which the hinge portion of FIG. 1 may be obtained.

FIG. 6 illustrates preferred embodiments of the hard metal cup members.

DESCRIPTION OF A PREFERRED EMBODIMENT

Figure 1:
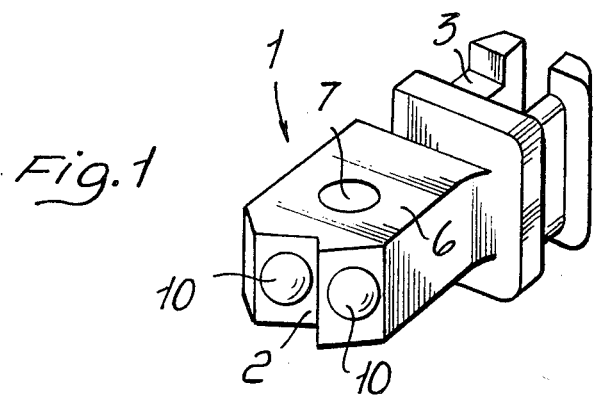
FIG. 1 illustrates the portion of a hinge, for plastics material spectacles frame, provided for housing the hard metal cup members.
Figure 2:
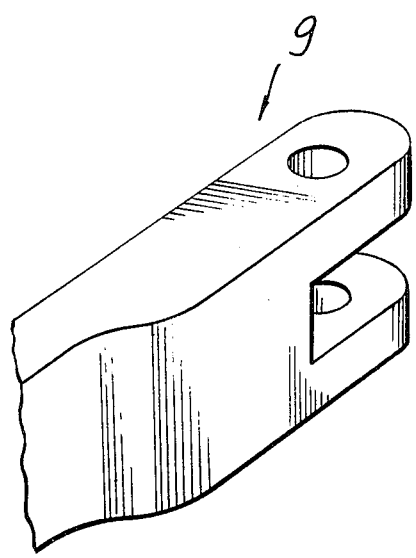
FIGS. 2 and 3 illustrate two bifurcated members, respectively of a metal material, in single piece with the arm, and of a plastics material, effective to be rotatively coupled to the mentioned hinge portion.
Figure 3:
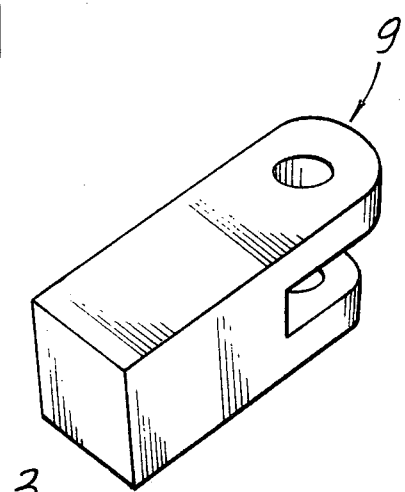

With reference to the figures of the accompanying drawings, the method for making resilient hinges for spectacles according to the present invention comprises the step of providing a small plate member 1, which is essentially provided with an edge 2 thereto shaped members made of a hard metal material may be firmly coupled as well as a portion 3, also suitably shaped, effective to allow for said members to be locked either on the front portion or on an arm of the spectacles frame.

More specifically, the mentioned plate may be obtained either by cutting a suitable cross-section sectional member 4 or by shearing a blade member 5, made of an easily machinable material such as nickel silver.

That same plate will be obviously subjected to suitable conventional processing steps, in order to form therein a portion 6 provided with a throughgoing hole 7, effective to be rotatively coupled, through a threaded member 8, to the two legs of a bifurcated member 9 forming the spectacles arm end portion.

On the edge 2 of the mentioned plate there are formed two bores 10, effective to hold corresponding cup members, made of stainless steel or of a sinterized material, which cup member may be provided with a spherical surface 11 or not spherical surface 11', or with two flat converging surfaces 11" depending on the requirements.

More specifically, the counterbore 10 in which the outer cup is housed may be threaded in such a way as to allow for the related cup, also threaded on its cylindrical outer surface, to vary the position of the spring biassed ball, in such a way as to provide different angular positions of the spectacles arm at the opening dead point.

In this connection it should be noted that the mentioned counterbores, providing holding seats for said cups 11, are preferably made on slanted surfaces in order to allow for the arms to be set in a parallel relationship, as well as for providing gradual resilient reactions, during the arm opening and closing movements, thereby allowing for the outer cup to act as an opening stroke stop member.

Figure 7:
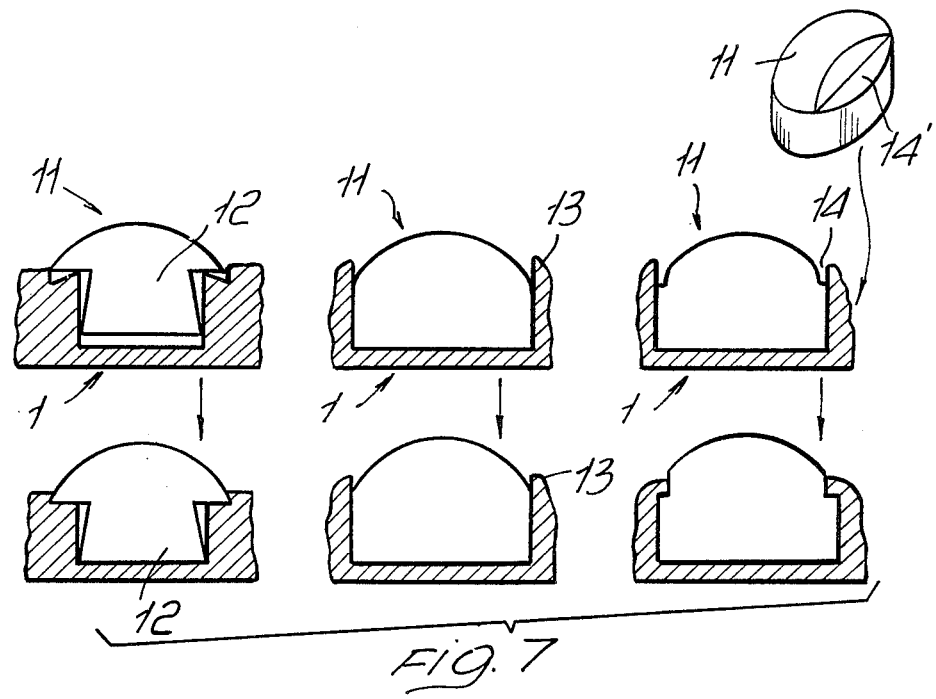
FIG. 7 illustrates a possible procedure for coupling the cup members and hinge.
Figure 8:
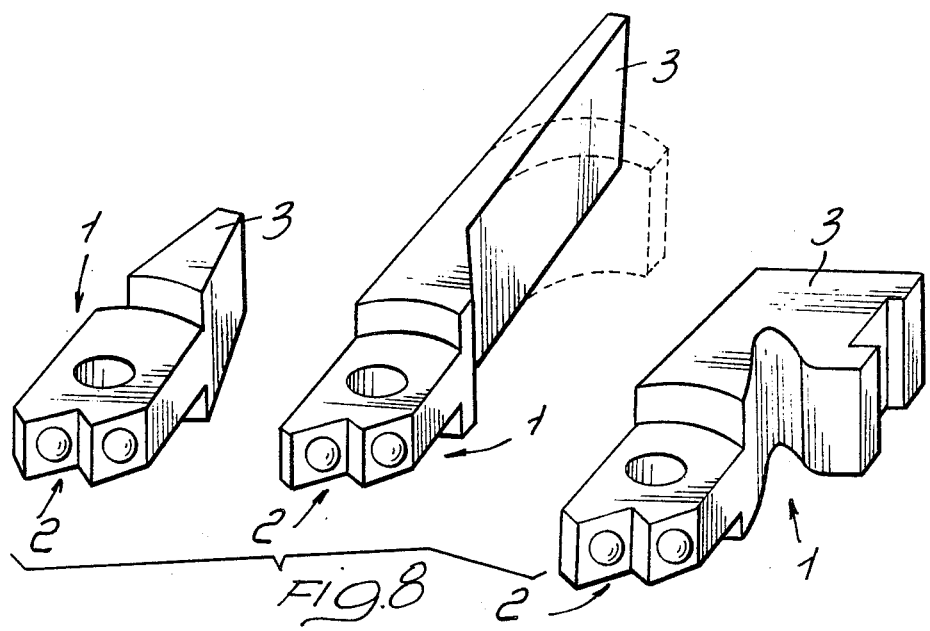
FIG. 8 illustrates some embodiments of a hinge provided for metal frames, effective to house the mentioned cup members.
Figure 9:
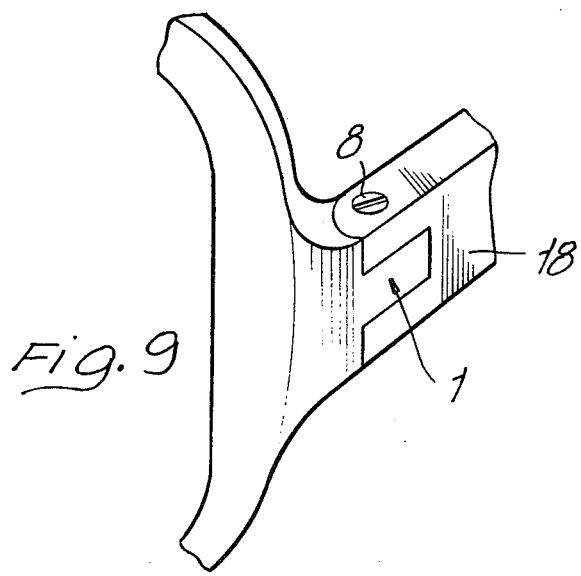
FIG. 9 illustrates the coupling between a spectacles front portion and a plastics material arm, obtained by means of a hinge produced by the subject method.
Figure 10:
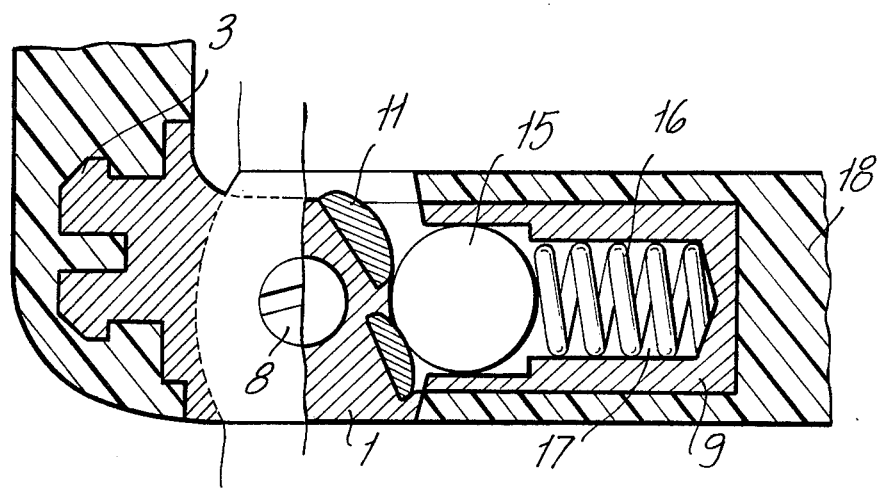
FIG. 10 is a horizontal cross-sectional view of the mentioned coupling.
Figure 11:
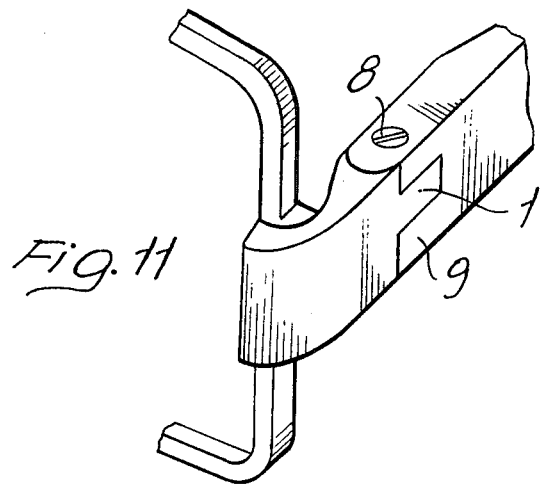
FIG. 11 illustrates a further coupling between a spectacles front portion and arm, in a metal frame.
Figure 12:
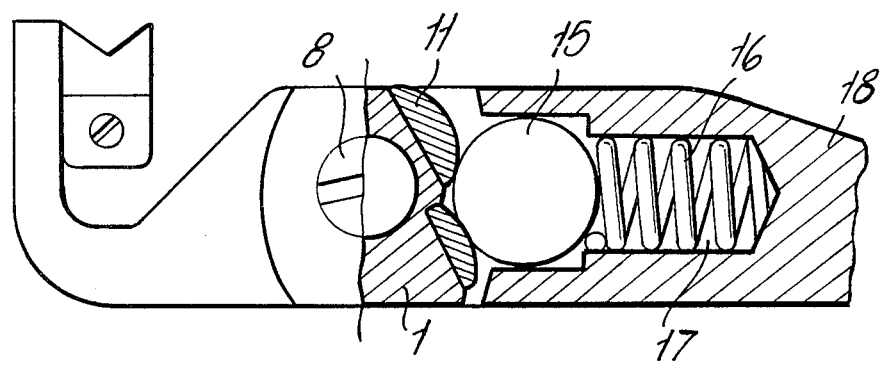
FIG. 12 is a horizontal cross-sectional view of the coupling shown in FIG. 11.

The anchoring of the individual cup members in their seats may be obtained, as it is schematically illustrated in FIG. 7, by using mushroom cup members and deforming the housing of the stem 12, or by caulking the edge 13 of the mentioned counterbores on the cup convex portion, or by bending the edge of said counterbores on an abutment member as perimetrically formed with respect to the cup, all along the extension 14 thereof, or at a single sector 14'.

It should also be noted that the anchoring of said cups in their seats may also be obtained by other like methods, such as glueing methods and the like.

The mentioned cups engage with a ball member 15, biassed by a spring 16, which are housed in a suitable cylindrical seat 17, which is formed along the axis of the rod 18 and being open at the bifurcated portion 9 forming the end portion of said rod or arm.

It should also be pointed out that the cam profile, obtained by means of two cups, is merely a preferred embodiment and that it may also be obtained starting from different mating members, or it may be made of a suitably shaped single piece of a hard material.

In this connection it should also be noted that, since the contacting surfaces of the ball and cam members are in actual practice both of spherical configuration, the friction therebetween is reduced to a minimum, thereby providing even and precise movements of the arms.

Figure 13:
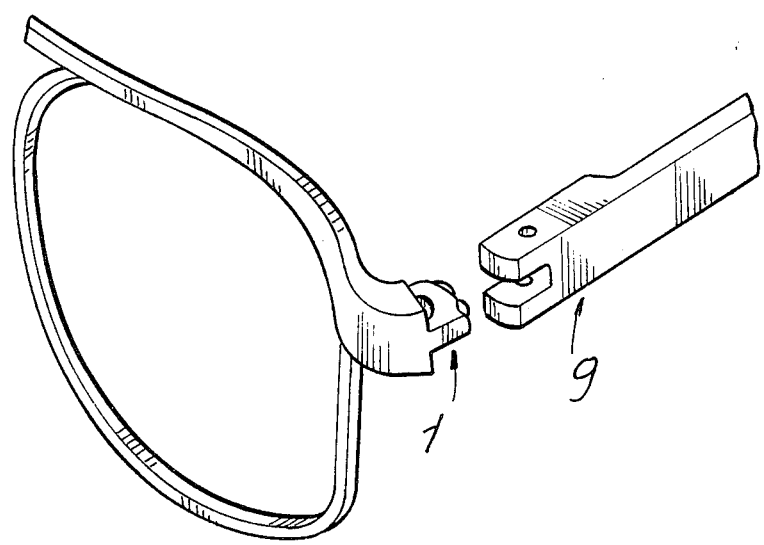
FIG. 13 illustrates a resilient spectacles hinge according to the present invention, therein the hinge portion rigid with the frame is made in a single piece with the spectacles frame itself.

In particular, the above cam member supporting plate may be also formed directly in the spectacles frame (both arm portion and front portion), as it is shown in FIG. 13, preferably in metal material frames, but also in molded plastics material frames, provided that the latter be provided with suitable hardness characteristics.

The latter approach is made possible by the fact that the resilient reaction force is supported by the two cup members, without affecting other portions of the hinge.

Moreover the hinge assembly may also be made in a reversed arrangement, that is with the cam profile applied on the arm and the ball-spring assembly located in the portion rigid with the spectacles front portion.

From the above disclosure and the figures of the accompanying drawings the great constructional simplicity and the possibility of producing a broad range of spectacles frames characterizing the method for making resilient hinges for spectacles according to the present invention are evident.

In fact, in the method, the hinge is processed as a conventional hinge and it becomes "resilient" at the last stage, as the shape thereof has been already defined, since the cup members may be applied during a last assembling step, with the hinges already applied to the spectacles frame.

In other words, before applying the screw for coupling pivotally the spectacles arm and front portion, it will be possible to affix the cup members by means of one of the methods thereinabove illustrated.

While the subject method has been disclosed and illustrated by way of an indicative and not limitative example, it will be clear that it is susceptible to several modifications and variations all of which are included within the scope of the invention, as defined in the accompanying claims.

I claim:

1. The method of making a spectacles frame having a front portion, having plate members, having side arms connected to said front portion, and a hinge for pivotally securing one of said side arms to one of said front portion, said frame bearing cam surfaces for resiliently holding each of the side arms to the front portion, which method comprises the steps of forming plate members; providing each of the plate members with a contoured edge; providing said edge with a plurality of bores; anchoring a cup member made of hard material in each of said bores, which anchored cup members provide said cam surface; forming in the end of each side arm, a ball seat positioned such that said seat is adjacent said front portion when the frame is assembled; inserting a ball member in said seat after inserting a spring in said seat to bias said ball and to urge said ball into contact with said cam surfaces; said plate, said arms, and said front portion being made of a material different from the material of said cup members, said plate member being housed in a portion of the spectacles frame.

2. The method according to claim 1, wherein said cup members are anchored in the seats by using mushroom shaped cup members and deforming the seat housing around the stem of the cup members.

3. The method according to claim 1, wherein said cup members have a spherical surface and are enclosed in the seats by caulking the edge of said bores on the convex portion of said cup members.

4. The method according to claim 1, wherein said cup members have an abutment portion perimetrically formed and said cup members are enclosed in the seats by bending the edge of said bores against said abutment portion.

5. The method according to claim 1, wherein said cup members are cups which have a spherical surface.

6. The method according to claim 1, wherein said cup members are cups which are provided with two converging surfaces.

7. A hinge for resiliently coupling the side arm to the front portion of a spectacles frame, which hinge comprises a plate having a cam surface, said plate having bores with cup members anchored in said bores thus forming said cam surface, said cup members being made of hard material, said arm housing a ball and a spring which biases said ball into contact with said cup members, said plate, said front portion, said side arm being made of a material other than the material of said cup members, prepared by the method of claim 1.

8. A hinge for resiliently coupling the side arm to the front portion of a spectacles frame, which hinge comprises a plate having a cam surface, said plate having bores with cup members anchored in said bores thus forming said cam surface, said cup members being made of hard material, said arm housing a ball and a spring which biases said ball into contact with said cup members, said plate, said front portion, said side arm being made of a material other than the material of said cup members, prepared by the method of claim 2.

9. A hinge for resiliently coupling the side arm to the front portion of a spectacles frame, which hinge comprises a plate having a cam surface, said plate having bores with cup members anchored in said bores thus forming said cam surface, said cup members being made of hard material, said arm housing a ball and a spring which biases said ball into contact with said cup members, said plate, said front portion, said side arm being made of a material other than the material of said cup members, prepared by the method of claim 5.

* * * * *